(12) United States Patent
Valerio

(10) Patent No.: US 12,059,687 B2
(45) Date of Patent: Aug. 13, 2024

(54) METHODS AND SYSTEMS FOR HIGH THROUGHPUT SEPARATION OF MATERIALS USING STRATIFICATION AND ROTATIONAL MOTION

(71) Applicant: Thomas A. Valerio, Atlanta, GA (US)

(72) Inventor: Thomas A. Valerio, Atlanta, GA (US)

(*) Notice: Subject to any disclaimer, the term of this patent is extended or adjusted under 35 U.S.C. 154(b) by 0 days.

(21) Appl. No.: 17/655,628

(22) Filed: Mar. 21, 2022

(65) Prior Publication Data
US 2022/0203376 A1    Jun. 30, 2022

Related U.S. Application Data

(63) Continuation of application No. PCT/US2020/052325, filed on Sep. 23, 2020.

(60) Provisional application No. 62/904,367, filed on Sep. 23, 2019.

(51) Int. Cl.
*B03B 5/40* (2006.01)
*B09B 3/38* (2022.01)

(52) U.S. Cl.
CPC . *B03B 5/40* (2013.01); *B09B 3/38* (2022.01)

(58) Field of Classification Search
CPC .. B03B 5/28; B03B 5/62; B03B 5/623; B03B 5/40
See application file for complete search history.

(56) References Cited

U.S. PATENT DOCUMENTS

| | | | | |
|---|---|---|---|---|
| 1,988,371 A | * | 1/1935 | Chance | B03B 5/40 |
| | | | | 209/172.5 |
| 2016/0303609 A1 | | 10/2016 | Rudas et al. | |
| 2017/0205749 A1 | * | 7/2017 | Adaniya | B65H 5/38 |
| 2018/0272356 A1 | * | 9/2018 | Valerio | B02C 23/10 |
| 2019/0351427 A1 | * | 11/2019 | Previero | B29B 17/02 |
| 2020/0094262 A1 | | 3/2020 | Valerio | |

FOREIGN PATENT DOCUMENTS

WO    2020191114    9/2020

OTHER PUBLICATIONS

International Search Report, dated Dec. 17, 2020, from corresponding International Application No. PCT/US2020/052325.
Written Opinion of the International Searching Authority, dated Dec. 17, 2020, from corresponding International Application No. PCT/US2020/052325.

* cited by examiner

*Primary Examiner* — Jacob S. Scott
*Assistant Examiner* — Miraj T. Patel
(74) *Attorney, Agent, or Firm* — Greenberg Traurig LLP; Nigamnarayan Acharya

(57) ABSTRACT

Systems and methods can sort materials of different specific gravities in a mixture. These systems and methods for separation of materials provide multiple forces simultaneously. The system can utilizes both vertical and the horizontal forces for efficient separation of materials with different specific gravities.

20 Claims, 4 Drawing Sheets

METHODS AND SYSTEMS FOR HIGH THROUGHPUT SEPARATION OF MATERIALS USING STRATIFICATION AND ROTATIONAL MOTION

TECHNICAL FIELD

This application relates to methods and systems for high throughput separation of materials using stratification and rotational motion. More specifically, this application provides an efficient technique of using multi-unit linear arrangement for separating the materials into different components using stratification and rotational motion.

BACKGROUND

Recycling of materials in waste stream or in low grade fluid is highly desirable from various viewpoints. A properly sorted recyclable material may often be sold for significant revenue. Many of the valuable recyclable materials are not biodegradable within a short period of time. Therefore, recycling of such materials significantly reduces the strain on the local landfills and ultimately reduces the stress on the environment.

One of the few conventional separation techniques utilizes a screen, that separates the particles in the mud based on sizes. However, the disadvantage to such a method occurs when the sizes of the impurity is same as the material to be retrieved. A second common separation technique is the centrifuge separation or rotational motion separation. The centrifuge uses high acceleration forces in order to pin dense particles to the butt of a spinning chamber from where they are removed and recovered. However, the disadvantage to this method is that coarser materials also get pinned to the wall together with the dense minerals. Therefore, the separation can be difficult.

WO Patent Application No. 2018102617 discloses a system including multiple units in a linear arrangement which employs process of density separation. Moreover, the system provides more control over agitation and other forces separating the materials. The system also includes a paddle-wheel to create movement to optimize the residence time (faster or slower) to optimize separation.

US Patent Publication No. 20200094261 discloses a system for cyclonic separation of materials. The system includes an inclined inlet in which materials enters from one end and the materials that enter include a tangential velocity component as they enter. Moreover, the invention includes a three-dimensional sorting system with an outward centrifugal motion and vertical motion, where the flow of water or other media provides separation, which can be thought of as "a three-dimensional separation."

The combination of diverse materials of diverse sizes, densities, shapes and moisture content provide a few unique challenges in separating and recycling in an efficient manner. The ability to efficiently separate and concentrate recyclable materials at high throughputs from the different waste streams reduces the negative environmental impact of these materials, as less of this residue will be disposed of in landfills.

Accordingly, there is always a need for methods and systems to separate metals and materials from a waste stream. It is to this need, among others, that this application is directed.

SUMMARY

This application generally relates to systems and methods for high throughput separation of materials using stratification and rotational motion. This application provides systems and methods for separating materials of different specific gravities in a waste stream, and many cases high throughput, continuous separation.

This application includes a system for high throughput separation of materials in a waste stream. The system includes a unit with a top and a bottom, an infeed chute for receiving the waste stream, impellers or paddles/paddle wheels for receiving the waste stream from the infeed chute. Moreover, the paddle wheel rotates vertically to generate an agitated waste stream and provides sedimentation of heavy components of the materials for removal by a conveyor or stored in a container.

Another embodiment includes a system for providing high throughput separation of materials in a waste stream. The system includes a unit and can have an infeed chute for receiving the waste stream; a paddle wheel for receiving the waste stream from the infeed chute, wherein the paddle wheel rotates vertically to generate an agitated waste stream and provides sedimentation of heavy components of the materials in one or more first set of containers or sections (or moved away) positioned below the paddle wheel; two or more impellers for receiving the agitated waste stream from the paddle wheel, wherein a first impeller of the pair of impellers is placed at a first position near the paddle wheel and a second impeller of the pair of impellers is placed at a second position near the first position and away from the paddle wheel, the pair of impellers provide a horizontal shear force to the agitated waste stream for through-putting light components of the materials and collection of the agitated waste stream in one or more second set of sections positioned below the pair of impellers; and two or more outlet units, wherein a first outlet unit is positioned near the second impeller to discharge the light components of the materials, further wherein a second outlet unit is positioned below the first set of sections and the second set of sections to discharge the heavy components of the materials.

In another embodiment, the system also includes multiple impellers or vertical paddles of the like for receiving the agitated waste stream from the paddle wheel, where one impeller is placed at a first position near the paddle wheel and other impeller is placed at a second position near the first position and away from the paddle wheel. Moreover, the multiple impellers provide a horizontal shear force to the agitated waste stream for through-putting light components of the materials and collection of the agitated waste stream in multiple containers or sections positioned below the multiple impellers.

In another embodiment, there can be multiple outlet units included in the system. One outlet unit of the multiple outlet unit is positioned near the other impeller for discharging the lighter components of the materials. Furthermore, other outlet unit of the multiple outlet unit is positioned below the multiple containers or sections for discharging the heavy components of the materials.

One aspect of the application includes systems and methods for sorting materials of different specific gravities in a low grade mixture. The system separates materials by providing multiple forces simultaneously. The system utilizes both vertical and the horizontal forces for efficient separation of materials with different specific gravities. The vertical force can be provided by the paddlewheel and the horizontal force is provided by the multiple impellers.

Another aspect includes a sorting method for separating materials in a low grade waste stream. The sorting method includes the following steps: Firstly, feeding the waste stream through an inlet unit into the system. Then agitating the waste stream by the agitator based on the vertical rotation. The agitator generates an agitated waste stream. Followed with, settling of heavy components from the materials in container placed below the agitator.

Then, through-putting the agitated waste stream from multiple impellers. The multiple impellers provide a horizontal shear force forming a S-curve to the agitated waste stream for through-putting light components of the materials. Discharging the light components and the heavy components from the multiple discharge units, where the light components are discharged from a first discharge unit and the heavy components is discharged from a second discharge unit.

Another aspect includes a system for separating materials in a low grade (e.g., have lower amounts of valuable materials) waste stream. The system includes multiple sensors for sensing rotation speed of the agitator and speed of the pair of impellers. The multiple sensors are connected to a computer controlled algorithm. Moreover, the multiple sensors are capable of adjusting speed of the paddlewheel and the pair of impellers for maximizing efficiency of the separation of materials.

The details of one or more embodiments are set forth in the accompanying drawings and the description below. Unless otherwise defined, all technical and scientific terms used herein have the meaning commonly understood by one of ordinary skill in the art to which this invention belongs. All publications, patent applications, patents, and other references mentioned herein are incorporated by reference in their entirety. In case of conflict, the present specification, including definitions, will control. Other features and advantages of the invention will become apparent from the description, the drawings, and the claims.

DETAILED DESCRIPTION

This application generally relates to systems and methods for high throughput separation of materials using stratification and rotational motion. In general, this disclosure includes methods and systems for separating materials in a waste stream. The waste stream contains heavier and lighter materials. The methods and systems can separate a heterogeneous mixture of particulate solids. The solids can have a plurality of different specific gravities.

The system can be a sorting system with the use of (1) up/down (or vertical) motion flow of water or other media, which can be thought of as a cascaded density separator, and (2) rotational motion, which results from impellers that transfer energy from a motor to stream. A sorting apparatus with two or more areas or units together where key separations may occur.

The multiunit system has units that are one or more rectangular shaped units in a linear arrangement. Water or other media can fill the entire cyclone to a predetermined level. While the bottom of the augur can may be cylindrical, the shape of the units is generally rectangular. Fluid forces on a centrifugal impeller, whose rotating axis whirls with a constant speed, can shear particles within the waste stream. The heavies (vs lights) have greater specific gravity and sink to the bottom of the units.

One embodiment of the system includes an infeed chute for receiving the waste stream or a liquid stream, a paddle wheel for receiving the waste stream from the infeed chute. Moreover, the paddle wheel rotates vertically to generate an agitated waste stream and provides sedimentation of heavy components of the materials below the paddle wheel.

The system can include multiple impellers for receiving the agitated waste stream from the paddle wheel, where one impeller is placed at a first position near the paddle wheel and other impeller is placed at a second position near the first position and away from the paddle wheel. Moreover, the multiple impellers provide a horizontal shear force to waste stream by accelerating to provide further separation distance between particles and abrupt changes in direction to agitate and improve separation of the waste stream for through-putting light components of the materials and collection of the agitated waste stream below the multiple impellers.

Multiple outlet units can be included in the system. One outlet unit of the multiple outlet units can be positioned near the other impeller for discharging the lighter components of the materials. Furthermore, other outlet unit of the multiple outlet unit is positioned below the multiple containers or sections for discharging the heavy components of the materials to allow heavier components to be conveyed out of or away from the system.

Figure 1:
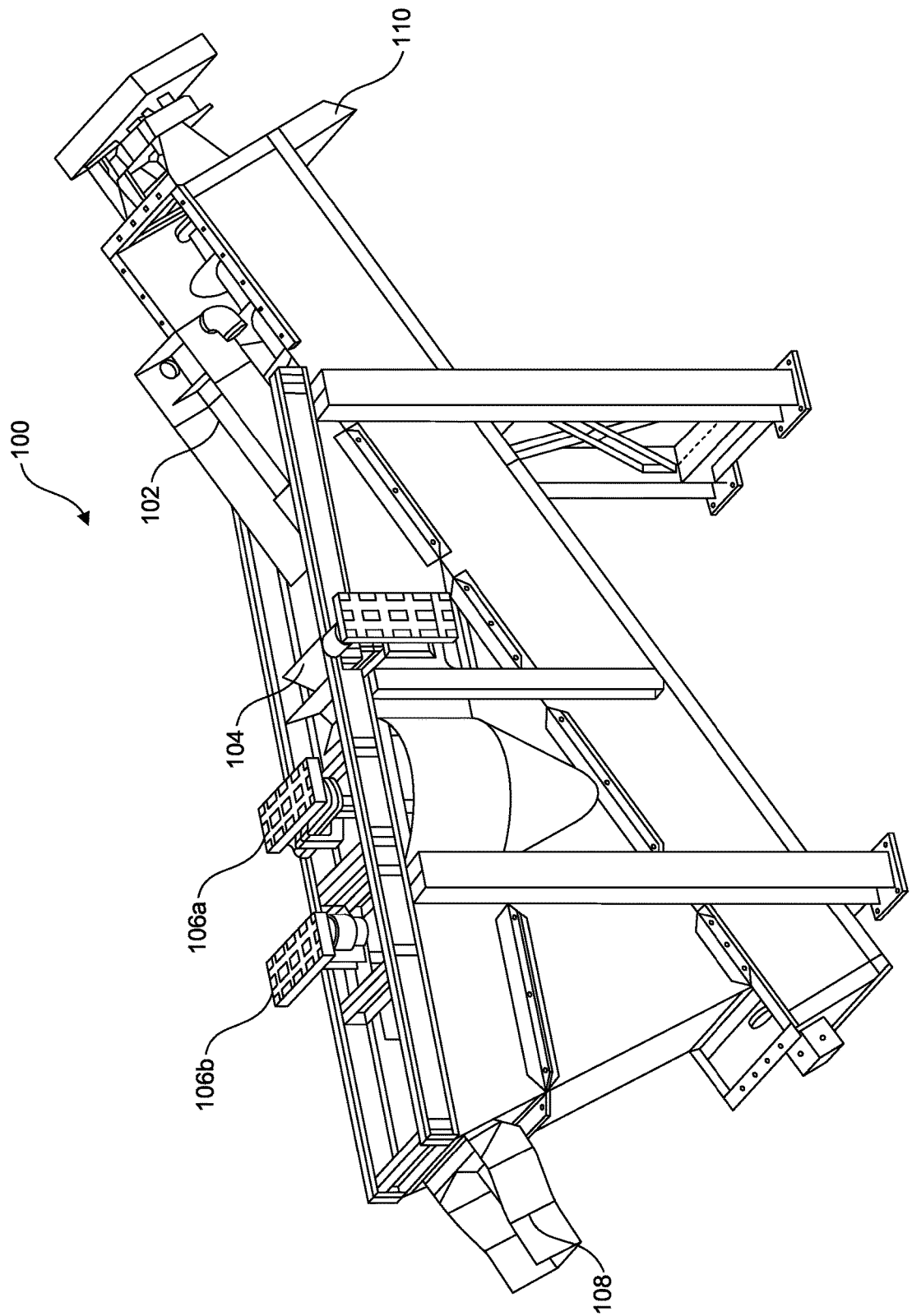
FIG. 1 is a perspective view of one embodiment of the system for separating materials in a waste stream.

FIG. 1 illustrates a system 100 for separating materials in a waste stream. The system 100 may be a multi-unit system. Each unit of the system includes an inlet unit 102, a paddle wheel 104, a pair of impellers (106a, 106b) and a pair of outlet units (108, 110). A waste or media stream can be introduced into the system via an infeed conveyor, slide chute, or pre-wet infeed system. In one example a first of the sections 114 may be rectangular and the second of the sections 114 may be conical or have conical aspects. There may be more or less than 2 sections or 3 sections or more sections.

Each of the units or areas, e.g., at or near the top of the multiunit or area system, can have a mixer or a paddlewheel or similar component (capable of moving water) that may be powered (or unpowered) to agitate the waste water stream in an up/down motion or forward accelerating motion, or combinations of the aforementioned. The paddlewheel 104 pushes sediment downward and abruptly slow down or change direction of the waste stream entering the unit (that may be at a relatively high speed), which improves separation of the material. When the water hits the rotating paddlewheel 104, the energy of the paddlewheel 104 is transferred to the water, forcing the water out to move or pulse or accelerate (or decelerate) or shift direction accordingly.

In one embodiment, the multiunit or area system 100 can hold a substantial amount of water or media due to its rectangular shape and its depth. The additional water or media allows for improved resonance time. In some instances, more than 40% of the heavy materials are forced downward. While in other instances, more than 50% of the heavy materials are forced downward, and in other instances, more than 60% of the heavy materials are forced downward.

Following or concurrent with the separation of the paddlewheel 104, the steam of material can be separated with one or more impellers. The impellers (106a, 106b) may be positioned at the top sections of the unit or area. In one embodiment, the impellers (106a, 106b) are in every top section, which are cylindrical and are set up in an "S" configuration, which improves the shear on particles and the stream. A constant flow of media, or a pulsating flow of water or media, is provided through a media circuit.

In one embodiment, the impellers (106a, 106b) may be set speeds to improve separation of a specific stream. One of more of the impellers (106a, 106b) may be set at a specific speed and one or more the impellers may be set at another speed. The rotation of the impellers (106a, 106b) may be set to each other in that one impeller may rotate clockwise and another may rotate counter clockwise. In other cases, one or more impellers may rotate in counter clock wise or clockwise direction.

The waste stream may be mixed with water or media at a predetermined SG entered through slide or mechanical conveyer so to enter the first unit of the multiunit system with significant speed and/or water or media volumetric flow rate so to facilitate an initial separation of the material within the first area of the apparatus. In some examples, the initial entry of material may yield nearly 50% or 60% or 70% or more of the desired separation by the force and turbulence of the material entering the unit.

The system to deliver media or materials with force or at high velocity include inlet in the form of a bare slides or slides including those having coatings to reduce the coefficient of friction or mechanical assisted conveyors. Primarily, ultrahigh-molecular-weight polyethylene (UHMW-PE) can used to prevent sticky particles from adhering to the surface. This type of conveying surface lends itself to reduced product adherence and allows expedition of the separation and cleaning processes.

In certain embodiments, the waste materials are mixed with media or water to create an initial slurry and to improve the separation as the material slurry is forcibly mixed with the media or water in the initial unit. By higher speed, it can be a speed or velocity higher than that of a typical conveyor. The slurry may have about the same specific gravity (SG) as the media in the first unit or the unit into which the slurry flow.

The continuous infeed of water or media displaces the contained water/media, causing to overflow the exit port/ weir of the apparatus, and more water can now enter. Materials to be sorted can enter the unit through a feed chute/inlet 102 located, e.g., on the top of the unit next to or above or below the paddlewheel 104.

The one embodiment the system 100 may locate the rotating paddlewheels 104 and/or impellers (106a, 106b) in an alternating pattern to drive the majority of the products in an S-curve along the length of the apparatus. The paddlewheel may cause a Dunking effect, which pushes the "floaters" or "light waste" down under the liquid which improves separation.

The paddle wheel (106a, 106b) may generate an up/down motion that is radial to the spinning axis leading to stratification. The stratification from the vertical motion or up/down motion of the paddlewheel (106a, 106b) is generated through a normal connection. Such connection allows for water or other media to be entered into the unit. Such water or media that enters through the normal connection generates an upward and downward motion, therefore the third-dimension of the separation apparatus. The normal connection may also be tangential and in the form of a chamber (downstream).

The system 100 can include an air-over-water pulsating chamber (not shown) but would be evident to those with ordinary skill in the art. In such an example, air inside a chamber expands and contracts creating an upward and downward flow of water into the unit through the normal or tangential connection.

The system may include multiple sensors. The multiple sensors can adjust drive mechanisms to produce an optimal paddlewheel speed or impellers by adjusting the rotation of the paddlewheel 104 or the pair of impellers (106a, 106b).

The various motions produce shear forces that force materials to move or agitate inside the units. The resulting action causes heavier particles to be liberated from the lighter particles. The heavier products that sink to the bottom are discharged at the bottom of the unit with the use of a discharge device such as a movable gate or rotary valve, screw auger, bucket conveyor, drag conveyor, or any other device to move the heavier particles or that prevent the continuous discharge of water or liquid or media but allows the heavier recyclables to exit when the device is energized.

The rotational speed of the paddlewheel(s) 104 as well as the frequency and stroke of the stratification/pulsation apparatus of the unit may be varied to optimize the separation process. In certain examples, side or bottom or rear injection points or nozzles can be used to introduce media or water, which can improve the separation of the material.

The upward and/or downward motion of the water or media enhances the separation by reducing the amount of lighter materials that are misplaced or entangled with heavier materials that sink to the bottom of the density separator. Such upward and downward motion, referred to as the third separation dimension, can be provided through the axial or tangential pipe or chamber in the form of pulses that generate upwards and downward currents or pulses of water or other media. Such inflow and outflow of water/media to the unit generates a momentary rising current of water that improves the separation efficiency and a momentary downward flow of water allows for the heavier particles to stratify. The inclusion of a pulsator or diaphragm can allow additional pulsation.

Figure 2:
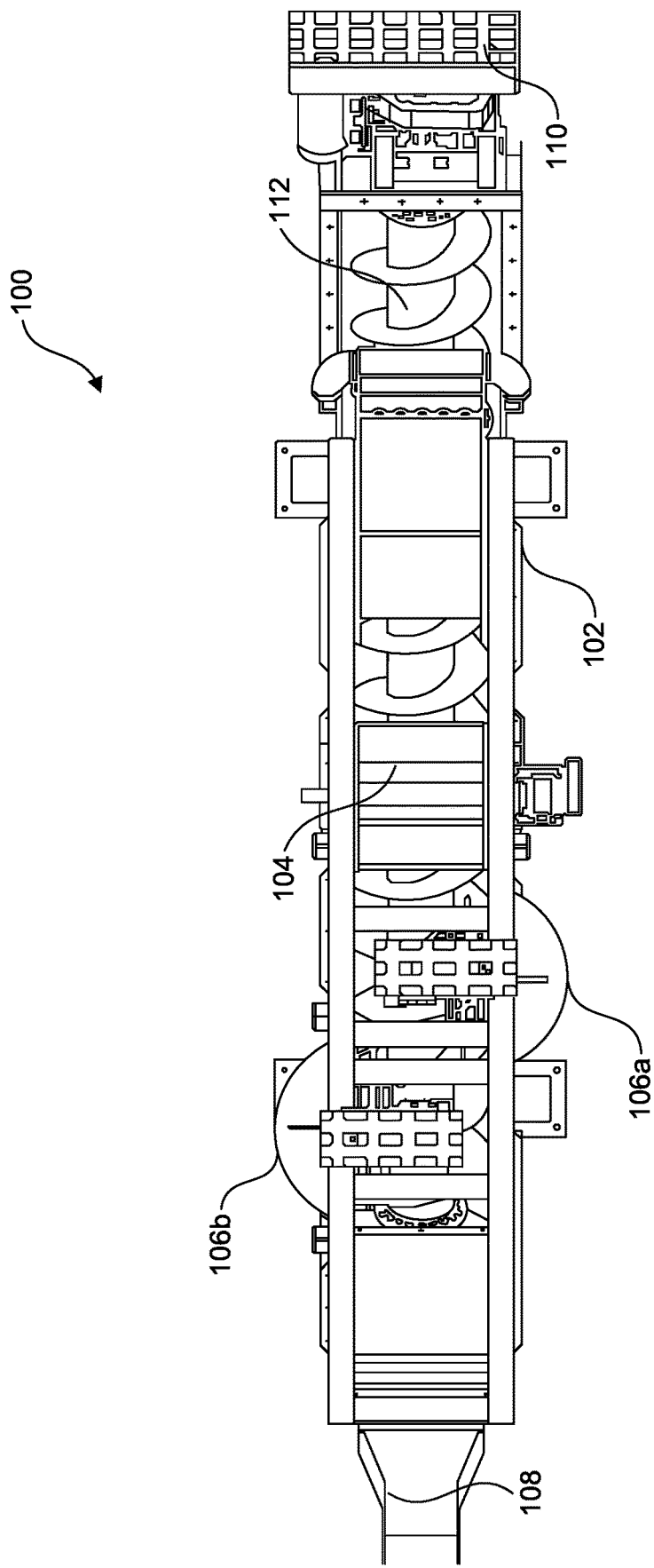
FIG. 2 is a side view of the system for separating materials in the waste stream.

FIG. 2 illustrates a top view of the system 100 for separating materials in a waste stream. The top view shows the positioning of the inlets unit 102, the paddle wheel 104 and rotor/impellers 106a and 106b for agitating the wastewater stream.

In one embodiment, the system includes multiple rectangular/box shaped units 112 to provide more control over the agitation and forces separating the material. More specifically, in this arrangement, the slurry or product stream is fed into the first unit or area, and from the first unit, the slurry or product stream flows into the second unit, and from the second unit the slurry or product stream flows into the third unit, and so forth. The paddlewheel in some or all of the units creates agitation and an upward/rising current, and the impellers create the shear motion. These features may improve the resonance time and the separation of the material.

In other embodiment, the waste stream may be fed directly into the additional impellers by the paddlewheel, which may improve or speed up the separation system. To improve the separation, system can have a mechanism to control the rotational speeds of the paddle wheels or impellers. For illustration, the system can set the first paddlewheel at a first step (e.g., 30 rpm) and the second paddle wheel at a second speed (e.g., 60 rpm). For illustration, system can set the first impeller 106a at a first step (e.g., 60 rpm) and the second impeller 106b at a second speed (e.g., 90 rpm). This arrangement creates further separation of the particles and materials in the media by creating a separation and shear force between the particles, whereby water/media will fill the space between particles, possibly in a visually stretched orientation when compared to the zone before the paddlewheel 104. The impellers (106a, 106b) keep the material in media and create a shearing force.

The motion of the water in upward and/or downward motion enhances the separation of media by reducing the amount of lighter materials that are misplaced or entangled with heavier materials that sink to the bottom of the density separator.

Figure 3:
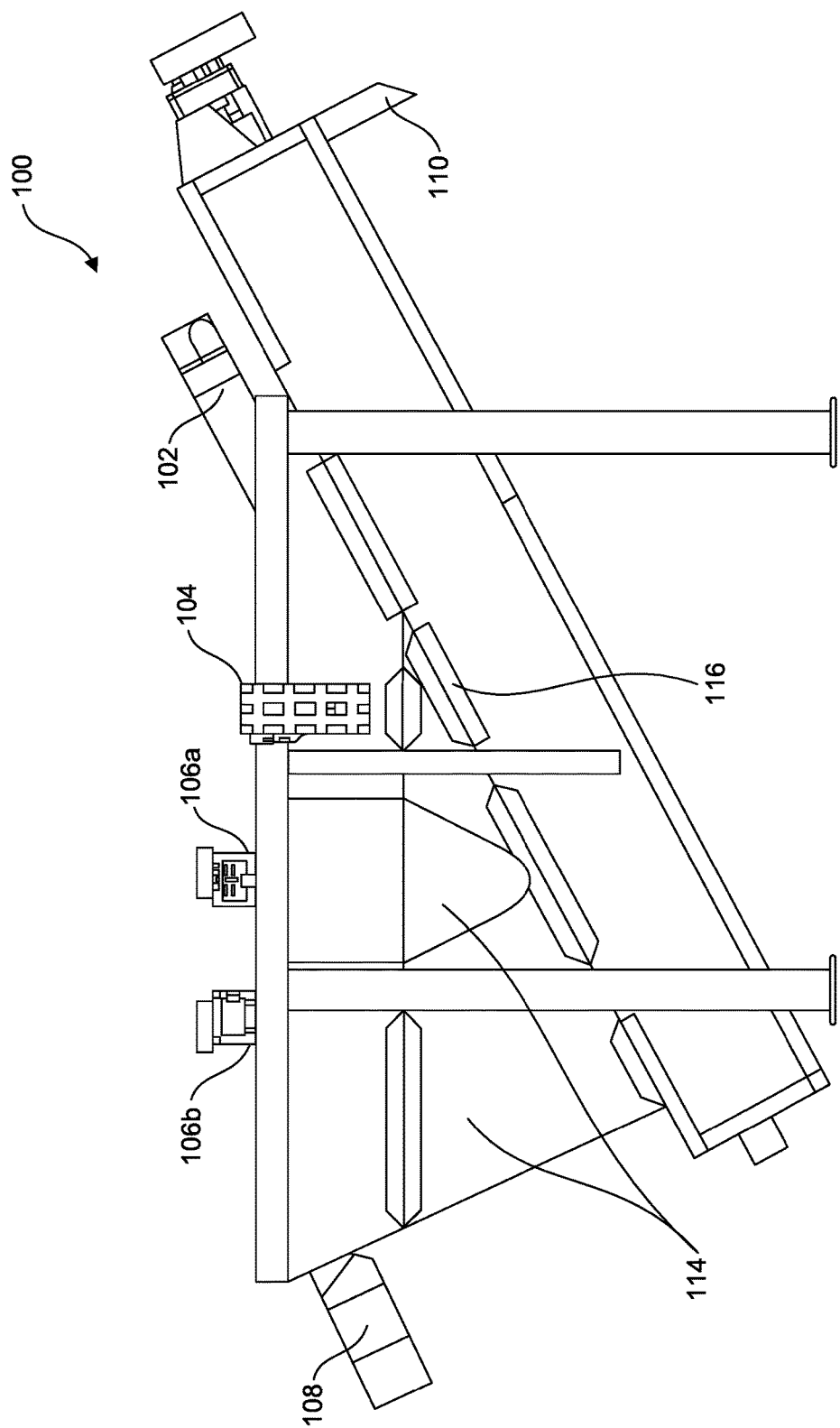
FIG. 3 is a top view of the system for separating materials in the waste stream.

FIG. 3 illustrates a side view of the system 100 for separating materials in the waste stream. The side view shows the system including the inlet unit 102 for receiving the waste stream, the paddle wheel 104 for receiving the waste stream from the inlet unit 102, the pair of impellers (106a, 106b), a pair of outlet units (108, 110), and a number of containers or sections or units or sections or sections 114 placed beneath the paddle wheel or the pair of impellers. Moreover, the paddle wheel 104 rotates vertically to generate an agitated waste stream and provides sedimentation of heavy components of the materials in a container positioned below the paddle wheel.

The paddle wheel 104 receives the waste stream from the inlet unit 102, wherein the paddle wheel 104 rotates vertically to generate an agitated waste stream and provides sedimentation of heavy components of the materials in one or more first set of containers or sections or units 114 positioned below the paddle wheel 104 and the pair of impellers.

The agitation motions produce shear forces that force materials to move inside the units. The resulting action causes heavier particles to be liberated from the lighter particles. The heavier products that sink to the bottom are discharged at the bottom of the unit with the use of a discharge device 116 such as a movable gate or rotary valve, screw auger, bucket conveyor, drag conveyor, or any other device to move the heavier particles or that prevent the continuous discharge of water but allows the heavier recyclables to exit through the heavy discharge outlet 110 when the device is energized. The lighter materials stay in suspension near the top of the unit are eventually discharged continuously by the carrying current through light discharge outlet 108 opening located on the opposite end of the unit or the entry/exit point of each zone or unit.

The system also includes multiple impellers (106a, 106b) for receiving the agitated waste stream from the paddle wheel, where one impeller 106a is placed at a first position near the paddle wheel 104 and other impeller 106b is placed at a second position near the first position and away from the paddle wheel 104. Moreover, the multiple impellers (106a, 106b) provide a horizontal shear force to the agitated waste stream for through-putting light components of the materials and collection of the agitated waste stream below the multiple impellers.

Further multiple outlet units can be included in the system. One outlet unit of the multiple outlet unit is positioned near the other impeller for discharging the lighter components of the materials. As can be seen by the figure, there can be a conveyor at the bottom that drags the material higher and in some case above the water level in the units. In other embodiments, the material can be discharged from the bottom and dragged away using a conveyor, a bucket conveyor, a screw conveyor or the like.

Figure 4:
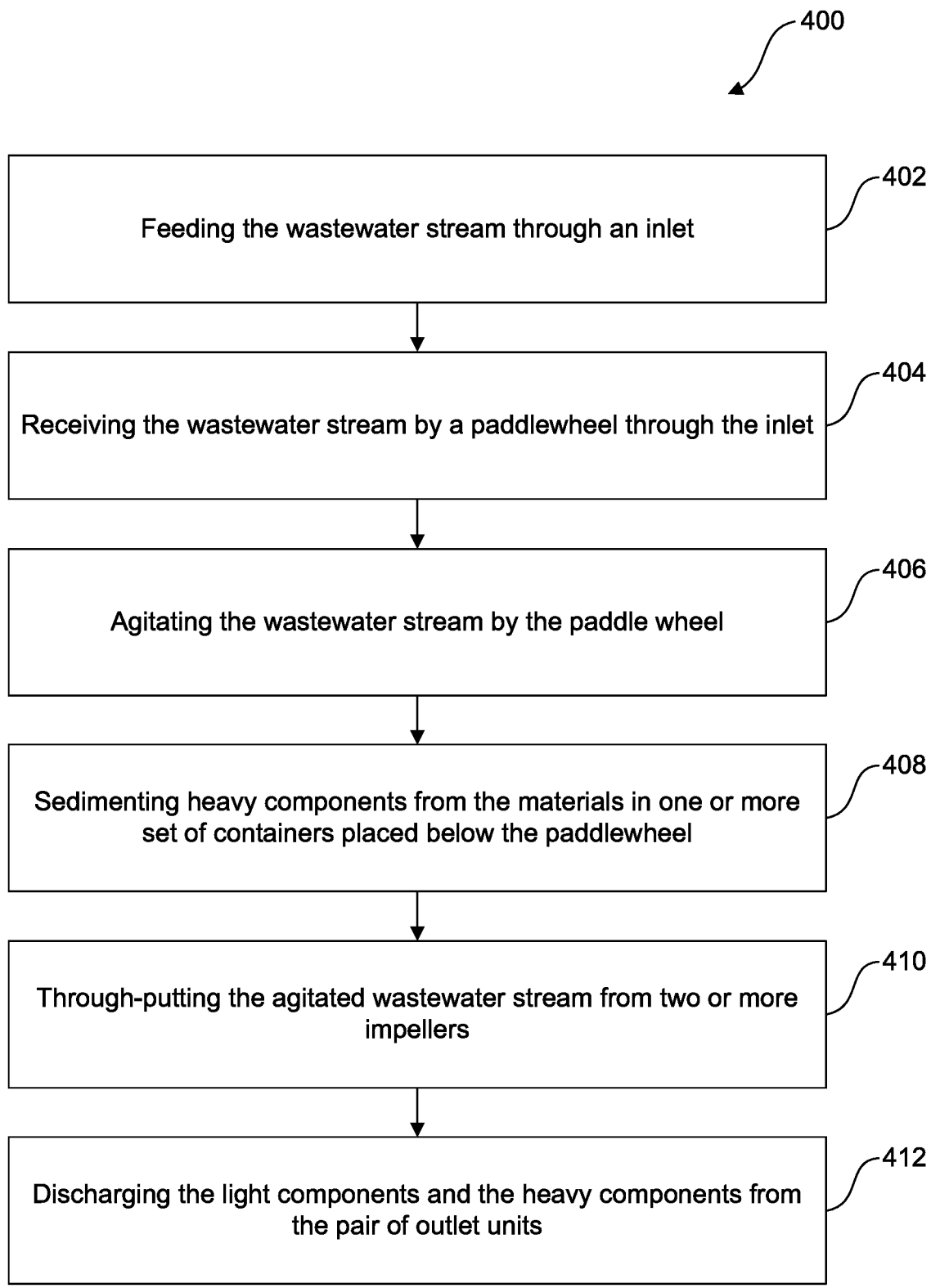
FIG. 4 shows an exemplary method for providing high throughput separation of materials in the waste stream by the system.

FIG. 4 illustrates a method for providing high throughput separation of materials in the waste stream by the system 100. The method includes feeding the waste stream through an inlet 402. The received waste stream is led to the paddlewheel in high velocity 404, as the inlet is in a slated position. The next step involves agitation of the waste stream by the paddle wheel 406, where the agitation is based on vertical rotation of the paddlewheel to form an agitated waste stream and controlled velocity progressing forward. As a results of agitation heavy components start separating from the materials in one or more set of containers or units or sections placed below the paddlewheel 408. The agitated water is then led to impeller for through-putting the agitated waste stream 410. A first impeller from the pair of impellers or two or impellers is positioned near the paddlewheel and a second impeller from the pair of impellers is positioned near the first impeller and away from the paddlewheel, further the pair of impellers provide horizontal shear force to the agitated waste stream. Discharging the light components and the heavy components from the pair of outlet units 412, wherein the light components are discharged from a first outlet unit, further wherein the heavy components is discharged from a second outlet unit.

In another embodiment, the media or fluid used in the recovery system may be any liquid capable of washing the materials and causing the metal to suspend into the process fluid. In other embodiments, the recovery system may use chemicals which can extract and suspend the desired constitute. Examples of such solutions are well known to those of skill in the art. One example of such a solution is water. In other embodiments, chemicals, minerals and or any magnetic material that can be used to change the specific gravity of the fluid to obtain an actual constant specific gravity range of 1.0 to 3.0 SG depending on the application. The 1.0 specific gravity separation chamber, because there is no added suspension media component it, that is, the liquid is water. Another alternative for attaining specific gravities of greater than 1.0 specific gravity media is through the use of magnetite or ferrosilicon, sand and mixtures thereof. In one example, the sand have a size less than 200 mesh, which is a byproduct of aggregate production, can be used. A specific gravity of about 1.6 can be used to separate organic and inorganic materials, about 3 can be used to separate heavy metals, and about 1.8 to 2.0 can be used to separate aluminium/magnesium.

In another embodiment, in some cases the media includes inorganic dirt, sand, glass fines, ferrous fines, ash (e.g., incinerator bottom ash, automobile shredder residue (ASR)), or fines, and combinations thereof, which can be screened with a screen having 16 mesh or less to create a suspension or media having a specific gravity of 1.5 or 1.6 SG or higher. In certain examples, the particles had a size less than 325 mesh (44 microns). In other examples, the particles had a size greater than 200 mesh (74 microns). In such cases, the apparatus can use inorganic media fines that can come from automobile shredder residue fines, shredder fines from Hammermill operations, ferrous slag or inorganic fine byproducts from incineration and/or pyrolysis operations. Further, other minerals that may be mixed in a landfill containing metals can be used. In one example, fines from a ball mill process (of e.g., ash) having 200 mesh or greater can be used to generate media, which can be used for as media to obtain media up to 3 SG.

In one example and without limitation, by using media with a specific gravity of 1.6 SG or higher, the costs to an operator can be reduced or nullified, that is, the costs to the operator may be net zero. Media with a specific gravity of 1.6 SG or higher can be separate organics and inorganics. A main difference between organics and inorganics is the fact organics contain carbon and that organics can then be used to produce a BTU feedstock for incineration, pyrolysis, or other separation to produce salable plastics, rubber, foam etc.

The material fed into the separator may be size reduced and classified through techniques for converting streams into fragments and particulates. For example, a shear shredder or screening may also be used to shred or size reduce the solid wastes and waste streams, to cause size reduction, fragmentation and particulate formation. In one example, the material is sized from about 0-12 mm, which in the case ASR and electronic scrap, the majority of recovered material will include inorganics, glass, rock, any other minerals. The material can also be sized from about 12 to about 100 mm, and greater than 100 mm. The solid wastes and waste stream materials can be size fragmentized into, e.g., discrete sizes. In some examples, the feed size is not the same as the screen size, which can lead to improved performance.

As used herein, the terms "heavier" and "lighter" refer to relatively greater and lesser specific gravity, respectively. The absolute weight can be less important than buoyancy in the fluid separation.

In another embodiment, there can be multiple separation systems that use two or more separators to separate materials in a mixture.

Although, the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of This application should not be limited by any of the above-described exemplary embodiments.

The invention claimed is:

1. A system for providing separation of materials in a waste stream, the system comprising:
   a unit have a top and bottom;
   an infeed chute for receiving the waste stream;
   a paddle wheel for receiving the waste stream from the infeed chute, wherein the paddle wheel rotates vertically to generate an agitated waste stream and provides separation of the materials;
   two or more impellers for receiving the agitated waste stream from the paddle wheel; and
   two or more outlet units, wherein a first outlet unit is positioned adjacent to the second impeller to discharge components of a first weight and a second weight, where the components of a first weight are heavier than components of a second weight,
   wherein the pair of impellers are positioned in an S-shaped configuration.

2. The system according to claim 1, wherein the pair of impellers rotate in a clockwise direction or in an anti-clockwise direction with respect to each other.

3. The system according to claim 1, the unit is rectangular in shape.

4. The system according to claim 1, wherein a first impeller of the pair of impellers is placed at a first position adjacent to a agitator and a second impeller of the pair of impellers is placed at a second position near the first position and away from the agitator.

5. The system according to claim 1, wherein a section of the unit is either conical, cylindrical or circular in shape.

6. The system according to claim 1, wherein the infeed chute is position at an inclination to deliver the waste stream with at a predetermined velocity.

7. The system according to claim 1, wherein the infeed chute includes a coating to reduce the coefficient of friction.

8. The system according to claim 1, wherein the coating is ultrahigh-molecular-weight polyethylene (UHMW-PE) coating.

9. The system according to claim 1, wherein the paddle-wheel rotates at a speed within 30 rpm to 90 rpm.

10. The system according to claim 1, wherein each of the outlet units includes either of a valve gate, rotary valve, screw conveyor, bucket conveyor, or a drag conveyor.

11. The system according to claim 1, wherein each of the outlet units further includes a conveyor selected from a sealed bucket conveyor, a sealed screw conveyor and a sealed drag conveyor.

12. The system according to claim 1, wherein a sensing unit monitor speed of the paddlewheel and the pair of impellers.

13. The system according to claim 12, wherein a second outlet unit discharges the components of a first weight; and the sensing unit maintains the specific gravity of the waste stream media within a range while addition of a media or water within the waste stream media.

14. The system according to claim 13, wherein the range varies from 1.5 SG to 3 SG.

15. The system according to claim 13, wherein a computer control algorithm is used to maintain the range of the specific gravity.

16. The system according to claim 15, wherein the sensing unit includes a plurality of sensors connected to the computer controlled algorithm for maximizing efficiency of the separation of materials and maintaining the specific gravity by addition of the media in the waste stream media.

17. The system according to claim 16, wherein the plurality of sensors are capable of adjusting speed of the paddlewheel and the pair of impellers for maximizing efficiency of the separation of materials.

18. A sorting system for separating materials in a waste stream, the sorting system comprising:
   a unit have a top and bottom
   an inlet unit for receiving the waste stream;
   an agitator for mixing the waste stream received from the inlet unit, wherein the agitator rotates in an up-down manner for generating an agitated waste stream and provides stratification of heavy components of the materials positioned below the agitator;
   two or more impellers positioned in an S-configuration, wherein the pair of impellers receive the agitated waste stream from the agitator, further wherein a first impeller of the pair of impellers is placed at a first position adjacent to the agitator and a second impeller of the pair of impellers is placed at a second position adjacent to the first position and away from the agitator, further wherein the pair of impellers provide an S-curve to the agitated waste stream for through-putting light components of the material and collection of the settled waste stream in positioned below the pair of impellers;
   a sensing unit for sensing rotation speed of the agitator and speed of the pair of impellers; and
   two or more discharge units, wherein a first discharge unit is positioned adjacent to the second impeller for discharging the light components of the materials, further wherein a second discharge unit for discharging components of a first and second weight, where the components of a first weight are heavier than components of a second weight.

19. The system according to claim 18, wherein the sensing unit includes a plurality of sensors having a computer controlled algorithm.

20. The system according to claim 19, wherein the plurality of sensors are capable of adjusting speed of the paddlewheel and the pair of impellers for maximizing efficiency of the separation of materials.

* * * * *